Dec. 16, 1969  J. A. WALKER ET AL  3,483,755
SEED PLATE TEST DEVICE

Filed Aug. 15, 1968  2 Sheets-Sheet 1

INVENTORS
JOHN A. WALKER
DANIEL HENRY
DARLO E. LIENEMANN

ATT'Y

Dec. 16, 1969  J. A. WALKER ET AL  3,483,755
SEED PLATE TEST DEVICE
Filed Aug. 15, 1968  2 Sheets-Sheet 2
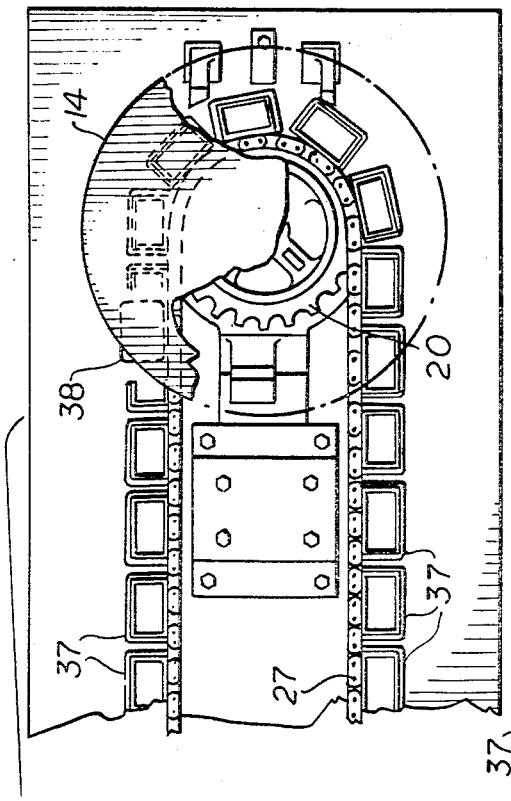
FIG. 3.
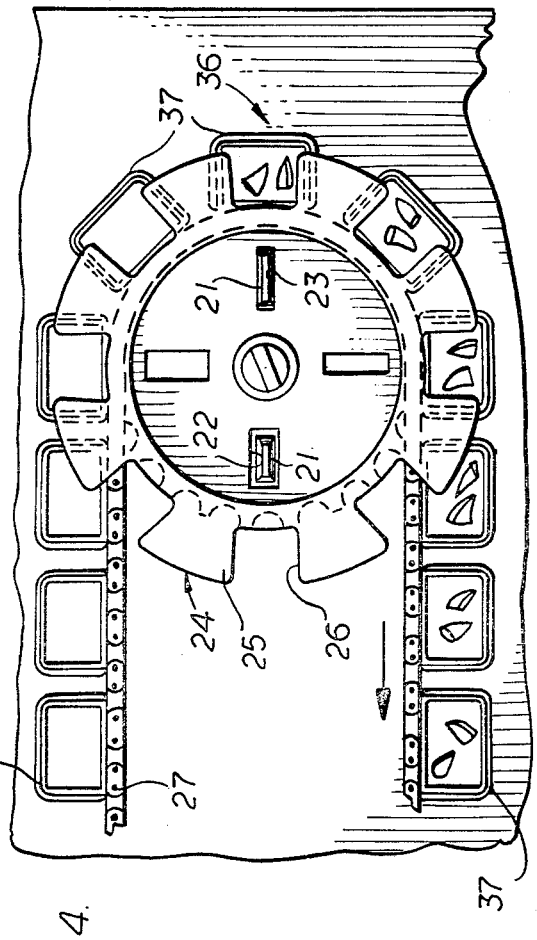
FIG. 4.
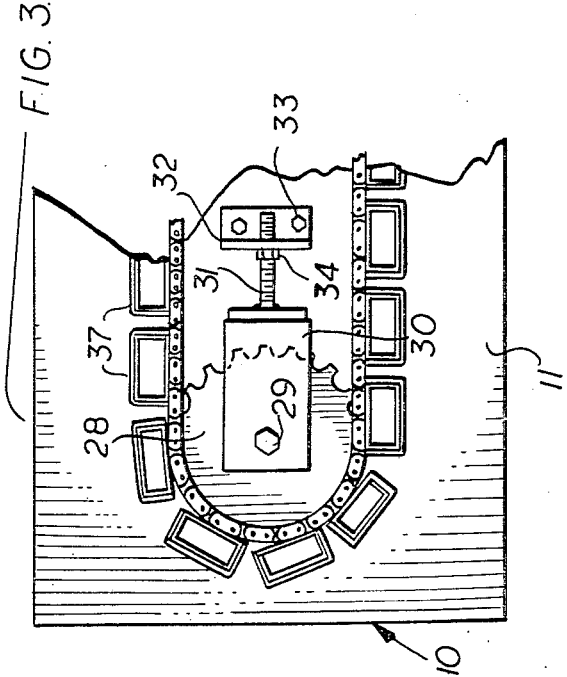
INVENTORS
JOHN A. WALKER
DANIEL HENRY
DARLO E. LIENEMANN
ATT'Y

United States Patent Office 3,483,755
Patented Dec. 16, 1969

3,483,755
SEED PLATE TEST DEVICE
John A. Walker and Daniel Henry, Downers Grove, and Darlo E. Lienemann, Clarendon Hills, Ill., assignors to International Harvester Company, Chicago, Ill., a corporation of Delaware
Filed Aug. 15, 1968, Ser. No. 752,899
Int. Cl. G01l 19/14; G01p 1/02; G01f 15/14
U.S. Cl. 73—432     3 Claims

ABSTRACT OF THE DISCLOSURE

A test stand for observing the accuracy of seed planters wherein a seed hopper and driven metering assembly is mounted on a work base over an endless chain to which are attached open bottom seed receptacles of a selected size and number which successively pass below and receive the metered seed. The seed in each receptacle passes over and is discharged by gravity through an opening in the work base.

BACKGROUND OF THE INVENTION

This invention relates to devices for testing the accuracy of seed planters and the like.

Seed testing devices are well known in the agricultural implement industry and are designed to test the accuracy with which planter units are adapted to meter and deposit seed in the ground. Seed corn, for example, varies considerably in size and is dispensed from hoppers having rotatable plates provided with peripheral cells of a size to fit corn of a size. For corn of a different size a plate having matching cells is provided, and in the manufacture of planters it is customary to provide a wide selection of seed plates from which, by installing in test apparatus, a farmer is able to select the plate having the right size cells for the seed to be planted. In the past, such testing devices have been crude and expensive and were not notable for their efficiency.

In testing planters it is important to determine the accuracy with which the seed plate discharges the seed from its cells and also the accuracy of accumulators utilized in hill dropping groups of two or more seed, and an object of this invention is the provision of improved testing means wherein seed is discharged from the metering device at planting speeds and is deposited in open top receptacles passing below the discharge outlet in timed relation to the rate of discharge, whereby the number of seed in each receptacle is easily and quickly observed and counted.

DESCRIPTION OF THE DRAWINGS

FIGURE 3 is a plan view, with parts broken away, of the testing apparatus of this invention; and FIGURE 4 is an enlarged plan view of a portion of the seed metering structure of the planter.

DESCRIPTION OF THE PREFERRED EMBODIMENT

Figure 1:
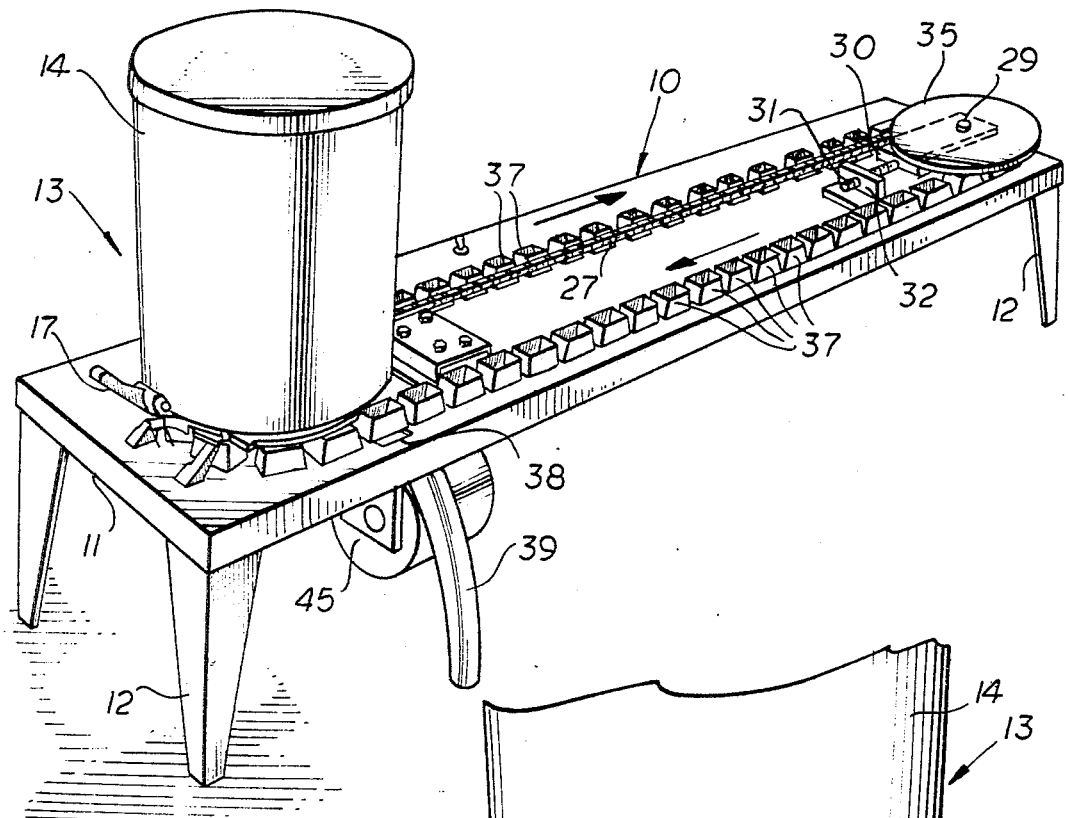
FIGURE 1 is a perspective view of a seed testing assembly embodying the features of this invention.

In the drawings the numeral 10 designates an elongated stand comprising a rectangular top 11 and supporting legs 12.

Figure 2:
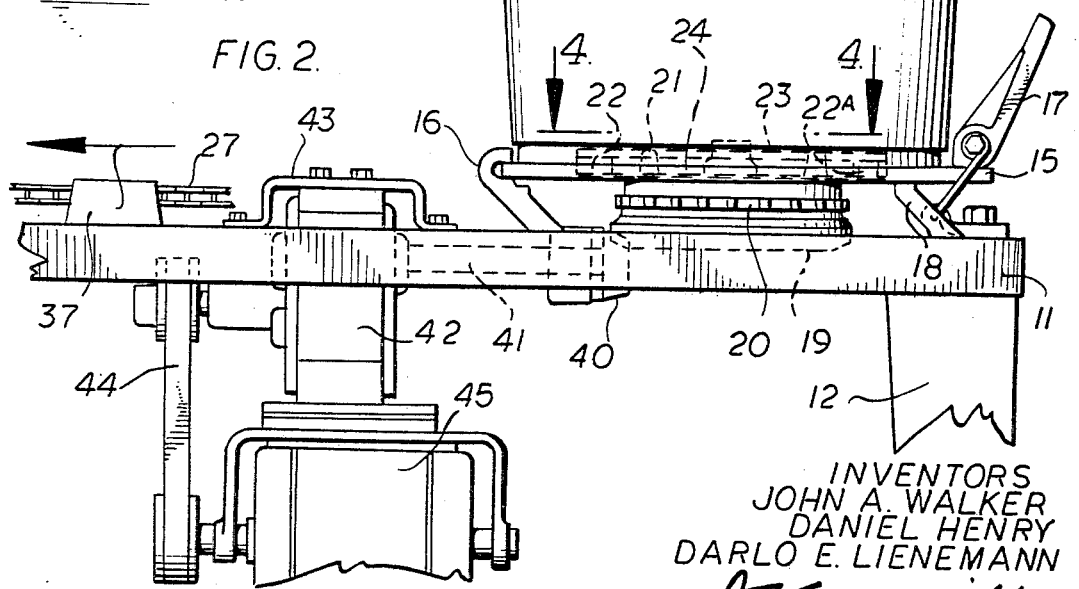
FIGURE 2 is an enlarged detail in side elevation of a portion of the testing apparatus shown in FIGURE 1.

At one end of the table is mounted a seed dispensing assembly 13 comprising a seed supply in the form of a hopper 14 having a base plate 15 (see FIGURE 2) supported at one side by a bracket 16 and releasably secured by latch means 17 at its other side to an upright 18 forming part of bracket 16, affixed to table top 11. Rotatably disposed in an opening provided in top 11 is a bevel gear 19 to which is affixed a rotary member in the form of a sprocket wheel 20 having upstanding lugs 21 receivable in slots 22 and 23 in an accumulator plate 24 having circumferentially spaced lugs 25 defining therebetween seed discharge recesses 26.

It may be understood that seed metering mechanism in the bottom of hopper 14 in addition to plate 24 includes a stationary bottom ring 22 and a conventional seed plate 23 having openings therein to receive driving lugs 21. Seed plate 23 is provided in well-known manner with circumferentially spaced cells each of which is adapted to receive a seed and discharge it through an opening indicated at 22a in bottom ring 22, in field operating equipment the seed falling one by one into guide tubes which direct it into furrows formed in the ground.

In order that the seed may be discharged in clusters of two or more, the lugs 25 of accumulator plate 24 are arranged to cover the outlet 22a in bottom ring 22, in the manner disclosed in U.S. Patent No. 3,117,540 to receive seed which is dropped singly from seed plate 23 and accumulate the seed in clusters of two or more for discharge by gravity.

Sprocket wheel 20, which drives seed plate 23 and plate 24 is driven by an endless chain 27, one end of which is trained around the sprocket wheel 20 and the other end around an idler sprocket wheel 28 mounted on a bolt 29 carried by a protective clevis 30 to which is affixed one end of a threaded stem 31 adjustably receivable in an opening provided in a bracket 32 secured by bolts 33 to the table top 11. Tension on chain 27 is thus achieved by adjusting nut 34 shown in FIGURE 3. As shown in FIGURE 1, cover 35 provides protection for sprocket 28 in addition to clevis 30 and is mounted on bolt 29.

The opening, not shown, provided in bottom ring 22 in the hopper 14 is arranged to discharge seed metered by seed plate 23 at a location designated 36 in FIGURE 4. This outlet is periodically blocked by lugs 25 to accumulate two or more seeds to be discharged through the peripheral openings 26 as indicated in FIGURE 4. To receive the seed groups and display them for visual inspection to determine the accuracy with which the desired number of seed is discharged through the openings 26, receptacles 37 are provided and secured to chain 27 at uniformly spaced locations. The receptacles or cells 37 are rectangular, open top and bottom, and preferably made of plastic material, the bottom of the receptacle being formed by the table top 11, with the receptacles sliding over the surface of the table top and the receptacles passing successively into vertical registry with the opening, not shown, provided in bottom ring 22 and in registry with the recesses or openings 26, so that seed discharged through the openings 26 in accumulator plate 24 fall by gravity into successive receptacles 37, as indicated in FIGURE 4.

Seed falling into the receptacles 37 is deposited on the surface of table 11 in sliding contact therewith fully visible for inspection, and is advanced in the direction of travel of chain 27 in an oval path over the table top. A discharge outlet 38 formed in the table top in the path of receptacles 37 registers with each thereof successively after the seed has been fully exposed to inspection substantially for the full length of chain 27 and registers with each receptacle successively, whereupon seed is discharged through opening 38 into a tube 39 from which it is collected in any suitable manner.

Chain 27 with receptacles 37, along with seed and accumulator plates 23 and 24, respectively, is driven by the engagement of gear 19 with a bevel gear 40 mounted on a horizontal shaft 41 connected to suitable reduction gearing carried in the housing 42 mounted on a bracket 43 secured to table top 11, and is drivingly connected by a belt 44 to a conventional electric motor 45.

What is claimed is:

1. In an apparatus for testing the accuracy of a planter unit, a support upon which said planter unit is mounted, said planter unit comprising a seed hopper having a bottom outlet and rotatable seed metering mechanism receiving seed from the hopper and discharging it through said outlet, drive means for said seed metering mechanism including a driving wheel, an endless member disposed below said hopper and operatively connected to said driving wheel and driven by said drive means, an idler wheel mounted on said support remote from said driving wheel and in engagement with said endless member, a plurality of open top and open bottom seed receptacles mounted at spaced locations on said endless member and arranged to register with said outlet to receive seed discharged from said metering mechanism, said seed receptacles being disposed sufficiently closely adjacent the surface of said support for the seed to be advanced thereover by engagement with the walls of the receptacle.

2. The invention set forth in claim 1, wherein said support is provided with an opening therein arranged to successively register with said receptacles to accommodate the discharge of seed therefrom by gravity.

3. The invention set forth in claim 1 wherein said driving wheel is a sprocket wheel and said endless member is in the form of a chain trained around said sprocket wheel and said idler wheel.

References Cited

UNITED STATES PATENTS 1,912,248   5/1933   Bateman _____ 222—252

CLEMENT SWISHER, Primary Examiner